United States Patent [19]

Davidson et al.

[11] Patent Number: 4,776,998
[45] Date of Patent: Oct. 11, 1988

[54] METHOD OF MAKING REFRACTORY SHAPED ARTICLES BY CUTTING VERTICALLY HANGING EXTRUDATES

[75] Inventors: Peter J. Davidson, Darlington; John F. Davidson, Cambridge; Frank A. Kirk, York; Donald L. Ralph, Billingham, all of England

[73] Assignee: Imperial Chemical Industries PLC, London, England

[21] Appl. No.: 926,533

[22] Filed: Nov. 4, 1986

[30] Foreign Application Priority Data

Nov. 8, 1985 [GB] United Kingdom ............... 8527661

[51] Int. Cl.$^4$ ............... B29C 47/34; B29C 53/02
[52] U.S. Cl. ............... 264/40.7; 264/148; 264/151; 264/504; 264/557
[58] Field of Search ............... 264/40.7, 148, 150, 264/504, 67, 143, 151, 557; 425/142

[56] References Cited

U.S. PATENT DOCUMENTS

| | | | |
|---|---|---|---|
| 2,526,289 | 10/1950 | Smith | 264/148 X |
| 2,822,600 | 2/1958 | Scott | 264/67 |
| 3,287,763 | 11/1966 | Diener | 425/142 |
| 3,655,856 | 4/1972 | Spivy | 264/150 |
| 3,824,196 | 7/1974 | Benbow et al. | 425/461 X |
| 3,985,848 | 10/1976 | Frische et al. | 264/504 |
| 4,150,078 | 4/1979 | Miller et al. | 264/67 X |
| 4,250,130 | 2/1981 | La Spisa et al. | 264/40.7 |
| 4,420,881 | 12/1983 | Bourget | 264/150 X |
| 4,585,600 | 4/1986 | Rollyson et al. | 264/148 X |
| 4,674,376 | 6/1987 | Hattori et al. | 425/142 X |

FOREIGN PATENT DOCUMENTS

| | | |
|---|---|---|
| 0055035 | 6/1982 | European Pat. Off. . |
| 0104811 | 4/1984 | European Pat. Off. ........... 264/40.7 |
| 0134138 | 3/1985 | European Pat. Off. . |
| 0140435 | 3/1980 | Fed. Rep. of Germany ........ 264/67 |
| 0042023 | 3/1985 | Japan ................................... 425/142 |
| 1204383 | 1/1986 | U.S.S.R. ............................... 425/142 |

OTHER PUBLICATIONS

McCartney Fluid Jet Cutting System; Desitech; Ingersoll-Rand Co.; U.S.A.; 1979.
Flow Systems, Inc.; U.S.A.; 1982.
Fluid Jet Cutting System; Desitech: Ingersoll-Rand Co.; U.S.A.; 1974.
Cutting with High-Pressure Water Jets; *Plastics Machinery & Equipment*; U.S.A.; Mar. 1980.

Primary Examiner—Jan H. Silbaugh
Assistant Examiner—Karen D. Kutach
Attorney, Agent, or Firm—Cushman, Darby & Cushman

[57] ABSTRACT

Shaped articles, especially ones containing a plurality of fine through passages, are made from a composition containing a refractory particulate material by extrusion, cutting the extrudate, while vertically hanging or suspending into lengths while in the green deformable state by a high velocity water jet, and then calcining to bind the refractory particles together. Depending on the nature of the refractory material, the articles are of use as catalyst supports or precursors, adsorbents, or absorbents. The extrudate is extruded horizontally and allowed to sag into a gap between the extrusion die and a transport device, which is driven positively to maintain the degree of sag within predetermined limits, and the frequency of cutting depends on the rate of movement of the transport device.

8 Claims, 1 Drawing Sheet

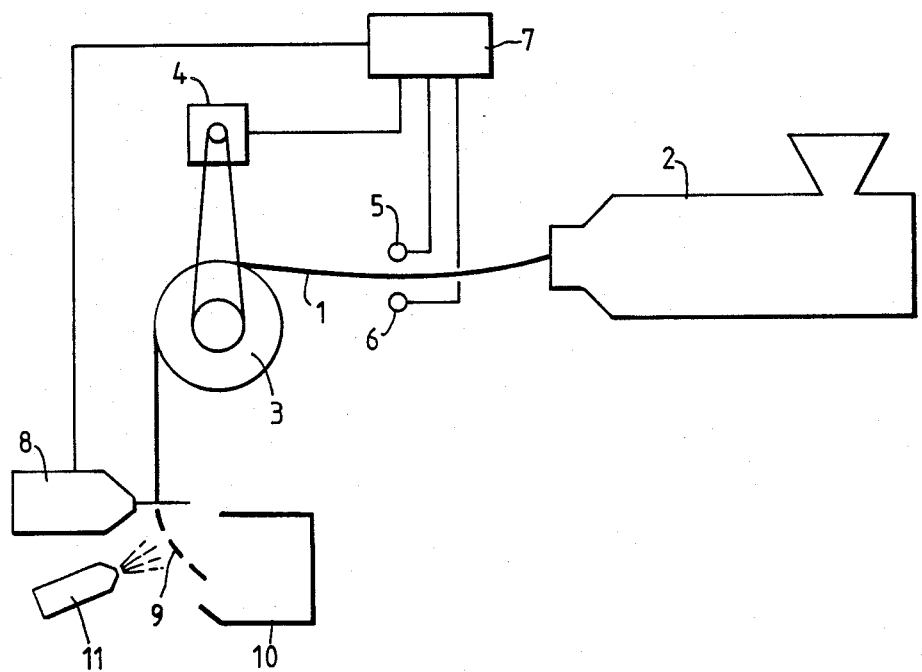

METHOD OF MAKING REFRACTORY SHAPED ARTICLES BY CUTTING VERTICALLY HANGING EXTRUDATES

This invention relates to refractory shaped articles suitable for use as catalyst supports, catalyst precursors, absorbents or adsorbents and in particular to their production by an extrusion process. Refractory articles are widely used as adsorbents, absorbents or as supports for catalytically active materials for use in various catalytic processes. Other refractory compositions e.g. iron oxide compositions are themselves useful as catalyst precursors; the active catalyst can be produced from such precursors by reduction.

One known method for the production of refractory shaped articles involves extruding a composition containing a particulate material through a die to give a green extrudate of the requisite cross-section and then calcining the green extrudate to remove volatiles and to bond the particles together. The articles are often required in discrete pieces and so the extrudate has to be cut to the appropriate length, which may be as little as 2 mm or may be up to 50 mm or more. While it would be convenient to cut the green extrudate to the requisite length, because the composition necessarily has to be deformable in order to effect extrusion, conventional cutting techniques, e.g. employing wires or guillotines, tend to cause significant distortion and deformation of the green extrudate pieces.

If this distortion is to be minimised it has therefore generally been necessary to effect cutting after calcination: consequently, because of the refractory nature of the calcined extrudate, relatively slow cutting techniques, e.g. employing diamond-edged saws, have to be employed. Cutting after calcination also causes problems with dust formation and inevitably involves some wastage.

While refractory shaped articles can be made by other techniques, such as pelletting, such techniques are less versatile in the shapes that can be produced.

We have found that distortion of the green extrudate upon upon cutting can largely be avoided by the use of a particular cutting technique, viz. water jet cutting.

Accordingly the present invention provides a method of making refractory shaped articles comprising
(a) extruding an extrudable composition containing a particulate material through a die to give a continuous, deformable, green extrudate;
(b) cutting the extrudate, while still in the green, deformable, state into lengths; and thereafter
(c) calcining the cut lengths to remove any volatile material and to bind together the oxidic particulate material,
the method being characterised by using a high velocity water jet to effect cutting of the green extrudate.

The water jet cutting technique involves directing at the extrudate a jet of water of thickness suitably in the range 0.05 to 0.3 mm at a high velocity, normally exceeding the speed of sound, and suitably in the range 300 to 1000 m.s$^{-1}$. In some cases it may be desirable that the water has dissolved therein a small concentration, typically 0.1 to 0.5% by weight of a hydrophilic polymer, such as a polyacrylamide, which stabilises the water jet. The high velocity water jet is conveniently produced by forcing the water under high pressure, typically in the range 1000 to 4000 bar abs., through a fine orifice. The high pressure is suitably attained in a two stage system comprising a booster pump to raise the pressure to a pressure in the range of 3 to 6.5 bar abs. and an intensifier pump, such as a hydraulically driven reciprocating plunger pump, to raise the pressure to the requisite high pressure.

Surprisingly, despite the deformable nature of the green extrudate, high velocity water jet cutting effects little or no deformation or distortion of the extrudate. This is of particular importance where the extrudate has thin walls, i.e. less than 2 mm, and/or narrow passages, e.g. of 2 mm or less, especially less than 1 mm, cross section dimension, therethrough since any significant distortion would tend to reduce the mechanical strength of the article and/or affect the free flow of material through such passages when the shaped article is used, e.g. for catalytic reactions.

The particulate material of the extrudable composition should include those ingredients necessary to provide the mechanical form and strength of the support and/or the precursor to the catalytically active material, absorbent, or adsorbent. Particularly suitable materials include alumina, silica, titania, zinc oxide, zirconia, magnesia, chromia, yttria, rare earth oxides, actinide oxides; solid solutions thereof (e.g. stabilised zirconia); multiphase combinations of oxides (e.g. partially stabilised zirconia, transformation toughened alumina); compound oxides such as magnesia alumina spinel, aluminium titanate, mullite, magnesium aluminium titanate, calcium aluminate, barium titanate, cordierite, and zeolites; and zinc carbonate. Also suitable are non-oxidic materials such as carbon, e.g. activated carbon, silicon carbide, sialon, silicon nitride and multiphase combinations, or the precursors thereof In some cases combinations of oxidic and non-oxidic materials may be employed, e.g. silica and carbon to produce silicon carbide after sintering, or mixtures of activated carbon and bentonite. Oxidic material that are of use as catalyst precursors or as catalysts per se include magnetite, haematite, nickel oxide, copper oxide, cobalt oxide, and cobalt molybdate. Where the oxidic material forming the major proportion of the extrudable composition is itself a catalytic material or precursor thereto, the extrudable composition will often contain one or more other oxidic materials, such as the above mentioned support or a rare earth, to act as a stabiliser to minimise sintering of the catalytic material during use.

To provide an extrudable consistency the composition usually contains a liquid and a viscosity-modifying polymer soluble or swellable in the liquid. If the liquid is water, which is preferred, the polymer can comprise for example, a soluble carbohydrate such as starch, alginate or xanthan gum; a cellulose ether; a protein; a polyvinyl alcohol, ester, acetal, or ether or mixed deivative e.g. a partially hydrolysed polyvinyl acetate; a polyalkylene oxide; a polyacrylate or methacrylate; or polyacrylamide or polymethacrylamide. Polymer mixtures may be employed. If the liquid is organic, for example a polyol such as glycol or glycerol, numerous organic polymers are suitable, for example polyolefins of high molecular weight (over 150,000) with a plasticiser such as a polyol or high boiling ester as the liquid.

Particularly suitable compositions are disclosed in EP-A No. 134138. As a further alternative the extrudable consistency can be due to a water-swellable inorganic compound oxide, for example a clay mineral such as bentonite or colloidal magnesium aluminium silicate sold under the trade name Vee Gum T.

In an important class of extrudable compositions the oxidic material is a hydraulic cement. Suitable extrudable hydraulic cement compositions are described in EP-A-55035.

The extrusion die typically provides an extrudate having one of the following cross-sectional shapes: circles or ovals; re-entrant figures such as lobed figures, typically having 2–4 lobes, e.g. a "clover-leaf configuration, triangles projecting from a circle or "cog wheels"; concentric circles, thus producing a single hole cylindrical product; circles with a plurality of inscribed small circles, thus producing a cylindrical product with a plurality of longitudinal bores therethrough; circles with a plurality of radii, typically 2 to 8, especially 3, 5 or 7 radii, thus producing products of the type commonly termed "waggon-wheels; circles with at least 3 symmetrically disposed intersecting non-diametral chords, thus producing a "partitioned ring" product; and a honeycomb, preferably with at least 9 openings per $cm^2$, each opening being of triangular, square, or hexagonal configuration.

The process is of particular utility in the production of cylindrical products having a plurality , e.g. 10 or more, of fine through passages, particularly passages of diameter below 1.5, more particularly below 1, mm.

The dimensions of the shaped article will depend on the intended use of the product: for use in randomly packed beds, the maximum overall dimension, i.e. the length, diameter etc., will generally be below 50 mm while the minimum overall dimension will generally be above 1.5 mm.

For fixed beds however larger products can be used as a monolith, e.g. honeycombs of cross-sectional dimensions at least 25 mm and preferably at least 50 mm. Such a-honeycomb may have a maximum cross-sectional dimension of up to about 300 mm or more.

However the best results in terms of distortion-free cutting have been achieved where the maximum cross-sectional dimension is below 25 mm.

Dies suitable for the production of extrudates having through passages will usually have a spider supporting cores, or more conveniently, a single block construction with primary and secondary channels, e.g. as described in our U.S. Pat. No. 3,824,196, or a plate-bundle construction.

After extrusion, the extrudate is cut as aforesaid to the desired lengths and is calcined to remove any volatile or combustible material and to bond the particles of the refractory material together. Such a calcining step may be performed in stages. Thus where the extrudable composition contains a volatile liquid, e.g. water, the extrudate pieces may first be dried, typically at under 200° C., especially at under 100° C., with care to avoid non-uniformity of heating and consequent strains. If desired over-rapid drying can be avoided by controlling the relative humidity of the drying atmosphere at a high level, for example at over 50%, especially over 70%. This applies especially where the extrudable composition contains water and a polymer in an amount of less than 10% by weight of the oxidic material, but analogous treatment is possible when the extrudable composition contains an organic liquid.

Drying by the use of a dielectric or microwave heater is also effective.

Where the refractory material is a hydraulic cement, curing of the latter may take place prior to, or during such a drying step, e.g. by heating the extrudate under conditions of controlled relative humidity prior to volatilising residual water.

The calcination step usually includes treatment at 200° to 700° C. in air to decompose and/or burn out any organic components, e.g. polymeric material added to aid extrusion. Where the binder is not harmful in the final product, it is not necessary to remove it by calcination.

Further calcination, typically at temperatures up to 1600° C. may be employed as necessary, as is known in the art, to effect bonding of the particles. Thus if the particulate material is already of the high temperature type such as alpha alumina, or is to be converted thereto, calcination at temperatures typically in the range 1000°–1600° C. may be carried out.

The same applies if compound oxides, for example magnesia alumina spinel, or cordierite are employed.

Where it is desired to effect phase changes in the material during the calcination, the calcination cycle should contain dwell times in the temperature regions appropriate to the desired phase change. It may also be desirable to effect changes in the surrounding atmosphere, e.g. from oxidising, i.e. air, to an inert or in some cases, reducing atmosphere or to include steam, in order to effect desired mineralogical changes in the product.

Where the particulate material of the extrudable composition does not already contain material that forms, or is convertible to, the desired catalytically active or adsorbent, or absorbent material, after calcination the support may be impregnated or coated with the active material or with a material that is convertible thereto, e.g. by heating and/or chemical reaction e.g. reduction.

The active material, or material convertible thereto, will of course depend on the nature of the process for which the shaped articles are to be used. Examples of catalytically active materials, or materials convertible thereto, include iron, nickel, copper, silver, rare earth, and precious metal compounds.

In the method of the invention, the green extrudate is cut, as mentioned above, by the use of a high velocity water jet as a knife to slice through the extrudate. It has been found that the best results are obtained if the extrudate is suspended vertically and is cut horizontally with the jet. This enables the cut extrudate pieces to fall away from the end of the continuous extrudate. Removal of the cut pieces from the cutting zone is usefully assisted by an air jet. If the extrudate is horizontal and cut vertically with the water jet, there may be a tendency for the cut pieces to adhere together giving rise to the possibiliy of distortion when the pieces are subsequently separated from one another.

In order to prevent any significant draw down of the extrudate from the extrusion die by the weight of the length of green extrudate hanging between the die and the cutting station, it is preferred that, where the cross-section of the extrudate so permits, the extrudate is extruded horizontally and then, while supported on a transport device, turned through 90° to the vertical position prior to the cutting position.

Where horizontal extrusion followed by turning the extrudate to the vertical position is not practical, for example where the extrudate is of a honeycomb cross-section having a minimum overall cross-sectional dimension of at least 1 cm, the extrusion may be directed vertically downwards and a transport device, e.g. a pair of endless belts, provided to lightly grip opposed portions of the extrudate to prevent draw-down from the die.

Also, for the reasons mentioned hereinafter, a transport device may be usefully employed between the die and the cutting station where the extrudate is extruded horizontally and cut with a vertical cut into the required lengths.

It is often desirable that the cut lengths of the extrudate have ends substantially perpendicular to the length of the extrudate. To achieve this it may be desirable to move the water jet in unison with the extrudate as the cut is being made.

For some applications, particularly where the product pieces are to be used as random packings in relatively narrow vessels, e.g. tubes, the uniformity of the lengths of the cut extrudate pieces may be important. Since the extrusion rate may be subject to significant variation, either of a periodic or random nature, merely making cuts at uniform times may not give adequate uniformity of the cut lengths.

We have found that by using a transport device as aforesaid in conjunction with horizontal extrusion, compensation for extrusion rate variation can be achieved. Thus by arranging that the frequency of operation of the cutting apparatus is dependent on the rate of movement of the transport device, the uniformity of the cut lengths can be improved: however we have found that, because of the inertia of the transport device, the movement of the latter may not accurately reflect the extrusion rate if the transport device is simply a moveable support, e.g. wheel or belt, whose movement is effected by the extrudate. Thus we prefer that the transport device is positively driven at a rate coupled to the actual rate of extrusion. This may be achieved by providing a space between the die and the transport device into which the extrudate sags slightly: the degree of sag is monitored by sensors which control the drive to the transport device. Thus two sensors displaced vertically with respect to one another may be provided. When the lower sensor is actuated by the extrudate sagging to the level of the lower sensor, thus indicating an increased extrusion rate, the transport device movement rate is increased. Likewise if the extrusion rate is reduced, the extrudate between the die and the transport device will sag to a lesser extent until the upper sensor is actuated whereupon the transport device movement rate is reduced.

It will be appreciated that with this arrangement the transport device movement may be arranged to be intermittent so that the cut can be made on a stationary part of the extrudate. In this way movement of the cutting device in the direction of travel of the extrudate in order to obtain perpendicular ends to the cut extrudate is not necessary. Thus in this arrangement the transport advances a predetermined length past the cutting station with each movement of the transport device: the frequency of the transport device movements and of the operation of the cutting device are determined by the rate of extrusion as monitored by the sensors.

It is however preferred to effect continuous transport of the extrudate and to move the water jet in unison with the extrudate to effect a perpendicular cut.

The above arrangement of a transport device, and sensors, in combination with horizontal extrusion so that the cutting frequency is coupled to the extrusion rate is of use not only with water jet cutting but also with other cutting methods, e.g. knives, guillotines, and flying wires, providing the distortion given by such other cutting methods can be tolerated.

Therefore in accordance with a further aspect of the invention we provide a method of making refractory shaped articles comprising
(a) extruding an extrudable composition containing a particulate refractory material through a die to give a continuous, deformable, green extrudate;
(b) cutting the extrudate, while still in the green, deformable, state into lengths; and thereafter
(c) calcining the cut lengths to remove any volatile material and to bind together the particulate material; characterised by
  (i) extruding the composition horizontally on to a driven transport device for receiving, supporting, and transporting the extrudate, and disposed between the die and a station at which the cutting operation takes place, with a gap between the die and the transport device, the rate of extrusion being such that the extrudate sags into the gap,
  (ii) sensing the degree of sag of the extrudate into the gap and controlling the rate of movement of the transport device to maintain the degree of sag within predetermined limits, and
  (iii) cutting the extrudate at a frequency of operation dependent on the rate of movement of the transport device.

The invention is illustrated by the following example in which apparatus of the type shown diagrammatically in the accompanying drawing was employed.

In the Figure an extrudate 1 is extruded horizontally from an extruder 2 and is received by a transport device in the form of a wheel 3 driven by a motor 4. Two optical sensors 5, 6 are positioned one above the other with one sensor, 5, above the extrudate 1 and one sensor, 6, below the extrudate 1 in the space between the extruder 2 and wheel 3.

Signals from sensors 5 and 6 are fed to a control unit 7 which controls motor 4.

The extrudate 1 is turned through 90° by wheel 3 so that it travels vertically downwards where it is cut into discrete lengths by a water jet cutter 8 which is arranged to move, by means not shown, in a figure eight pattern. The movement of cutter 8 is also controlled by control unit 7 so that the cutter moves, during the cutting operation, in unison with the extrudate 1.

The cut pieces 9 of the extrudate are directed from the cutting zone to a receiver 10 by a jet of compressed air from a supply 11.

The invention is illustrated by the following Examples.

EXAMPLE 1

10 kg of α-alumina (ALCOA A14–325 grade) 0.6 kg of microcrystalline cellulose (AVICEL PH 101) and 0.5 kg of a commercial extrusion aid, a polysaccharide (Zschimmer and Schwarz KP 1075) were mixed, thoroughly, in a paddle mixer. 4 liters of demineralised water were added as a fine spray to the powder whilst still stirring in the mixer. The wetted powder was passed three times through a 50 mm mincing machine to produce a uniform, plastic mass. The composition was screw extruded on a 25" BCRA/MALKIN machine through a die having an outlet diameter of 8.5 mm and provided with 7 suspended cores each of 1.2 mm dia. Extrusion rates were in the range 3–6 gm. sec.$^{-1}$ depending upon the auger speed. The extrusion was horizontal and the green extrudate was received by a driven wheel approximately 400 mm diameter with a vee-groove around its circumference. The wheel was so positioned to support the extrudate and turn it through 90° into the vertically downwards direction and through the cutting zone. The vertical centre-line of the wheel was spaced 150 mm from the die-face so that the extrudate was able to sag into the space between the die and the wheel. The degree of sag was monitored by optical sensors vertically displaced relative to one another by approximately 20 mm. The sensors thus actuated the drive to the wheel to maintain the degree of sag in the range approximately 4–16 mm.

At the cutting zone, the extrudate was cut by a jet of water directed horizontally at the extrudate. The jet was produced from a sapphire nozzle having a bore of 0.13 mm using a water pressure of 2800 bar. An air jet was used to direct the cut pellets away from the cutting zone. The nozzle was mounted in a reciprocating mechanism which moved it in a shallow figure of eight path across the extrudate and back at intervals: the reciprocating movement was in unison with the rate of movement of the extrudate so that a perpendicular cut was made. The frequency of operation of the reciprocating mechanism was determined by the rate of rotation of the wheel. The cut pieces of extrudate had a length of 8 mm with a uniformity of ±3%. The cut pieces of extrudate were free of flashes and distortion and there was no blockage in any of the longitudinal through holes despite their small diameter.

The cut pieces of extrudate were dried in an oven at 95° C. and then fired according to the following cycle:

Room temperature to 400° C. at a heating rate of 100° C. $hr^{-1}$, maintained at 400° C. for 4 hours, then heated at a rate of 100° C. $hr^{-1}$ to 1400° C. and maintained at that temperature for 2 hours followed by cooling at the natural rate of the furnace.

The resulting catalyst support units can be converted to catalyst pieces by application of an active compound such as copper chloride or silver nitrate or by application of a precursor compound such as copper oxide, nickel oxide, or palladium nitrate followed by reduction to give catalytically active material.

EXAMPLE 2

A particulate composition was made by mixing about 95% by weight of haematite powder, about 3% by weight of alumina trihydrate powder, about 1% by weight of calcium carbonate, and about 1% by weight of magnesium aluminate spinel. Each of the ingredients had been ground to a fine particle size, median particle size about 3 μm and essentially all the particles below 10 μm. To the particulate mixture there was added about 1% by weight of potassium carbonate, about 1% by weight of a high molecular weight polysaccharide, and about 4% by weight of corn starch, all based on the weight of the particulate mixture. To the particulate mixture was then added about 11–12% by weight, based on the weight of the particulate mixture of water. The resultant composition was mixed to give a homogeneous paste.

The resultant paste was extruded at room temperature using a die of circular cross section about 9 mm having 50 suspended wire cores arranged in three concentric rings of 29, 14, and 6 cores, around a central core; the wires were about 0.5 mm diameter.

The extrusion and cutting of the extrudate was effected as described in Example 1. The extrudates, of length about 8.5 mm, were free of flashes, showed no distortion, and exhibited no blocking of any of the 50 through passages.

The extruded pieces were dried, calcined, and sintered by the procedure of Example 1 using a sintering temperature of 1300° C. The resultant sintered units which had a diameter of about 8.5 mm and 50 through passages of diameter about 0.48 mm, were suitable for use as ammonia synthesis catalyst precursors.

We claim:

1. A method of making refractory shaped articles comprising
   (a) extruding an extrudable composition containing a refractory particulate material horizontally through a die to give a continuous, deformable, green extrudate;
   (b) receiving the extrudate on a driven transport device, and, while supported on the transport device, turning the extrudate through 90° so that a free end of the extrudate hangs vertically downwards;
   (c) cutting the vertically suspended extrudate, while still in a green, deformable, state into lengths with a high velocity water jet; and thereafter
   (d) calcining the cut lengths to remove any volatile material and to bind together the particulate material.

2. A method according to claim 1 wherein the extrudate has walls of thickness less than 2 mm.

3. A method according to claim 1, wherein the extrudate has through passages of less than 2 mm cross-section dimension.

4. A method according to claim 1 wherein the transport device is positively driven at a rate coupled to an actual rate of extrusion.

5. A method according to claim 1 wherein the extrudate is transported continuously and the water jet is moved in unison with the extrudate to effect a perpendicular cut through the extrudate.

6. A method of making refractory shaped articles comprising
   (a) extruding an extrudable composition containing a particulate refractory material through a die to give a continuous, deformable, green extrudate;
   (b) cutting the extrudate, while still in a green, deformable state, into lengths;
   (c) calcining the cut lengths to remove any volatile material and to bind together the particulate material;
   characterized by
   (i) extruding the composition horizontally on to a driven transport device for receiving, supporting, and transporting the extrudate, disposed between the die and a station at which the cutting operation takes place, with a gap between the die and the transport device, a rate of extrusion being such that the extrudate sags into the gap;
   (ii) sensing degree of sag of the extrudate into the gap and controlling a rate of movement of the transport device to maintain the degree of sag within predetermined limits;
   (iii) while supported on the transport device, turning the extrudate through 90° so that a free end of the extrudate hangs vertically downwards; and
   (iv) cutting the vertically suspended extrudate at a frequency of operation depending on the rate of movement of the transport device.

7. A method according to claim 6 wherein the extrudate is transported continuously and a cutter is moved in unison with the extrudate to effect a perpendicular cut through the extrudate.

8. A method according to claim 6 wherein the cutting is effected with a high velocity water jet.

* * * * *